US008260599B1

(12) United States Patent
Canning (10) Patent No.: US 8,260,599 B1
(45) Date of Patent: Sep. 4, 2012

(54) METHOD OF ASSEMBLING OVERLAPPING FUNCTIONS WITH OPTIMIZED PROPERTIES AND USE IN DESIGN/CONSTRUCTION/SIMULATION OF STRUCTURES

(76) Inventor: Francis X. Canning, Morgantown, WV (US)

( * ) Notice: Subject to any disclaimer, the term of this patent is extended or adjusted under 35 U.S.C. 154(b) by 713 days.

(21) Appl. No.: 12/408,707

(22) Filed: Mar. 22, 2009

Related U.S. Application Data (60) Provisional application No. 61/078,056, filed on Jul. 3, 2008.

(51) Int. Cl.
*G06F 17/50* (2006.01)
*G06G 7/62* (2006.01)

(52) U.S. Cl. ............................................. 703/13; 703/2

(58) Field of Classification Search ...................... 703/13
See application file for complete search history.

(56) References Cited

U.S. PATENT DOCUMENTS

| 5,572,125 | A * | 11/1996 | Dunkel ........................... 324/307 |
| 6,615,164 | B1 * | 9/2003 | Gopisetty et al. .................. 703/2 |
| 7,558,706 | B1 * | 7/2009 | Hoyler .............................. 703/2 |
| 2004/0010400 | A1 * | 1/2004 | Canning ........................... 703/2 |

OTHER PUBLICATIONS

Canning et al, "Fast Direct Solution of Standard Moment-Method Matricies", IEEE Antennas and Propagation Magazine, vol. 40, No. 3, Jun. 1998).*
Wan et al, "An Efficient Analysis of Large-Scale Periodic Microstrip Antenna Arrays Using the Characteristic Basis Function Method", Progress in Electromagnetics Research, PIER 50, pp. 61-81, 2005.*
Prakash et al, "Characteristic Basis Function Method: A New Technique for Efficient Solution of Method of Moments Matrix Equations", Microwave and Optical Technology Letters, vol. 36, No. 2, Jan. 20, 2003.*

* cited by examiner

*Primary Examiner* — Mary C Jacob (57) ABSTRACT

A method for constructing relatively independent overlapping functions that optimize a desired property is disclosed. This method allows the production of groups of functions, each group on a region. These regions may overlap. This allows the production of sources that have optimized properties, especially when those properties are enhanced by smoothness and/or by a larger size. A possible optimization method is also disclosed. These sources have many uses in numerical simulations of physical devices, such as valves, pipes, antennas, electronic circuits, and vehicles (air borne, land, and water). These simulations are useful in the design and construction of such devices. They are also useful in the testing of device properties, as they may provide an adjunct to testing physical mock ups of proposed designs.

17 Claims, 8 Drawing Sheets

Method of assembling Overlapping Functions with Optimized Properties and use in Design / Construction / Simulation of Structures

Method of assembling Overlapping Functions with Optimized
Properties and use in Design / Construction / Simulation of Structures

Method of assembling Overlapping Functions with Optimized
Properties and use in Design / Construction / Simulation of Structures

Fig. 7

Method of assembling Overlapping Functions with Optimized
Properties and use in Design / Construction / Simulation of Structures

Fig. 8

METHOD OF ASSEMBLING OVERLAPPING FUNCTIONS WITH OPTIMIZED PROPERTIES AND USE IN DESIGN/CONSTRUCTION/SIMULATION OF STRUCTURES

REFERENCE TO RELATED APPLICATIONS

The present application claims priority to U.S. Provisional Application No. 61/078,056 filed Jul. 3, 2008, titled, "Method of assembling Overlapping Functions with Optimized Properties and use in Design/Construction/Simulation of Structures," the entire contents of which is hereby incorporated by reference.

COMPUTER PROGRAM LISTING

A computer program listing in Appendix A lists a sample computer program for one embodiment of the invention, the entire contents of which is hereby incorporated by reference.

BACKGROUND OF THE INVENTION

1. Field of the Invention

The computations of the physical properties of objects such as how they reflect and/or transmit energy and other physical effects require computer memory and processing time. For many problems, especially for large or complicated situations, these computations take significant computer resources. Solving large problems using existing methods may not even be possible on available computers. A new method is described for creating overlapping functions that have specified properties. These overlapping functions may be used to make computations or simulations of physical and other effects more efficient. For example, it may be desired to create orthogonal or nearly orthogonal functions where many of them radiate weakly (or strongly) to some or all regions of space. Such functions may sometimes be known a priori for a specific regular ordered situations along with a specific property. However, such functions are not known for other properties to be achieved or for other geometries, such as for irregular curved surfaces with an irregular boundary. This invention discloses numerical methods for creating such functions for various properties and for various geometries and discloses methods for their use in the design and/or construction of structures with desired properties. For example, these overlapping functions may allow the prediction of physical properties such as mechanical stiffness, acoustic scattering or electromagnetic scattering. These properties may be predicted for a proposed design, that design may be modified based on this prediction, and an improved physical device may then be constructed.

2. Description of the Related Art

Overlapping functions can be very useful when they are available. For example, a time series is sometimes examined by taking successive Fourier transforms of successive pieces of that time series. Often, the time series is partitioned into sub series, and a discrete Fourier transform is taken of each sub series. Here the word partitioned implies that each sub series does not overlap any other sub series. It is known that when one takes a discrete Fourier transform of non-periodic data with a finite length, the Gibbs Phenomena makes that series converge slowly. This phenomenon is a result of the fact that any finite Fourier series or transform (for discrete or continuous data respectively) is smooth and periodic while a sample of a time series, when considered as a periodic function, is discontinuous at it edges.

In the late 1980s, a method was discovered for generating overlapping orthogonal functions that produce a smoother version of the partitioned Fourier transform. In the context of the history of mathematics, this is a very recent result. These Malvar wavelets, or local cosines as they are also called, were developed for one dimensional functions such as time series. The use of a tensor product allows this result to be generalized to some highly regular two dimensional (and higher dimensional) surfaces. For example, this generalizes it to a planar surface for certain partitionings of that surface into regular rectangular regions.

This invention discloses a method that applies to irregular regions and to a variety of desired properties. It also allows the optimization (or the production of a significant amount) of a user specified property. This property may be chosen to be the same or different from the property that Malvar Wavelets optimize. Often, by allowing overlap between the functions of one region with another (or others), this optimization (or increase) can be achieved to a larger degree.

This invention also discloses numerical methods for culling out extra functions that (exactly or approximately) duplicate others. For example, consider two regions that neighbor each other. Here a region might be one part of a partition (it might also have a more general meaning). There might be one or more functions associated with each region, and each function might overlap into another possibly neighboring region or regions. Since one function associated with each region actually exist partly in say both regions, they might even be the same function. Similarly, if there are a number of functions associated with each region, the space generated by (linear combinations of) the functions in one region might either exactly or approximately overlap with the space generated by the neighboring region. This invention provides methods for minimizing (or eliminating) these extra functions, and for doing so in a way that optimizes (or tends to maintain) a desired property (or the desired properties). In some cases (but not in others) this represents finding an orthogonal (or nearly orthogonal) set of functions. In some cases, these functions are identified with regions as described earlier in this paragraph. In other cases, there is no clear such identification.

One example of a desired property concerns features of the radiation from electric currents flowing on a surface (or within a volume). For example, modern aircraft sometimes use their skin (or outer surface) as an antenna. The shape of that surface might be determined primarily by airflow considerations, rather than by antenna considerations. Nevertheless, such a complicated (or at least curved) surface might then be used as an antenna.

It is well known from the design of standard antennas that one can produce a beam with smaller sidelobes when the electric current decreases in magnitude towards the edges of that antenna. The sidelobes are analogous to the peaks of the Gibbs phenomena, and often represent relatively strong radiation in an undesired direction. Antenna design textbooks contain a large number of "taper functions" and describe the how these tapers may be used to reduce the strength of the sidelobes. For standard antennas, it is generally desired to keep these sidelobes small, so that nearly all of the power is contained within the "main beam". Prior art has used several known taper functions on individual antennas.

The generation of overlapping excitations that produce specified properties such as narrow beams has many uses. For example, a large antenna might be thought of as a group of smaller antennas. One might design a large antenna by thinking of it as a collection of smaller antennas. If each produces a narrow beam, then one might ask how those narrow beams might be combined to produce an even narrower beam. This could be used to design antennas. These same principles also can be used in numerical computer programs that calculate electromagnetic effects. In such calculations the interactions between parts of a physical body may be computed using the analogy of those parts to antennas. These principles also apply to sound scattering and propagation, and to other effects. For example, they apply to the transmission of any form of energy, to physical effects, and to information flow. They apply to directional phenomena where the concept of a direction also involves a distance, such as a nearby region verses a distant region, and to properties other than directional characteristics. This invention relates, among other things, to new methods for producing overlapping currents or sources, where the currents for one antenna physically overlap the currents for another small antenna. It also relates to optimizing other properties using overlapping functions.

The use of a collection of (sub) antennas to design a larger antenna may provide efficiencies over numerical methods that have more parameters, such as the use of all of the degrees of freedom of each (sub) antenna. Methods that use high frequency approximations also reduce the number of degrees of freedom. Also, the use of a collection of sub antennas may allow a designer to have insight, or it may be used to synthesize a better performing antenna. Thus, this may not only allow a more efficient computation of an antenna's properties, but it may also aid in the design (synthesis) of more efficient antennas.

Overlapping functions may be created, for example, along a one dimensional surface. This invention provides a general method for constructing these and related functions. This method applies to general geometries such as creating overlapping functions defined on multidimensional surfaces and/or throughout multidimensional volumes. It also applies to general properties that may be optimized or made relatively strong.

SUMMARY OF THE INVENTION

There are many properties that may be better achieved using a relatively large physical region rather than a relatively smaller one. Often, a physical property may be better optimized either on the relatively larger region and/or by using a source that is smooth or nearly continuous in strength. For example, often a relatively localized physical source that varies in magnitude so as to smoothly approach zero strength at its ends or have some related property has desirable physical properties. Such sources often have a use in computing physical properties and in using such a computation to design and build various devices. These devices include circuits, antennas, ships, airplanes, etc. This invention provides a general method for constructing sources that have these and other desired physical properties, while these new sources may or may not vary so as to smoothly approach zero.

When sources are used over a physical region, that region may be thought of as comprising a number of relatively smaller possibly overlapping regions. If sources are not permitted to overlap, then it is difficult or impossible to use sources that both are smooth and that have a non zero strength at the all points. That is, if one group of functions stops at some boundary, and another starts there, the smoothness suggests that these functions all have zero strength at that boundary. Thus, overlapping functions may be desirable.

Methods are disclosed for producing overlapping functions or sources with desired properties and for ensuring these sources are not redundant. These will be called separated sources. Sometimes conditions stronger than non-redundancy are desired, such as restrictions on the condition number of a matrix describing these functions or orthogonality of the functions. Separated functions or sources may then be used in computing physical properties of devices and in designing and building such devices. Those skilled in the art know how these sources may also be used as receivers. While sources connotes producing an effect receivers connotes testing or being changed by such an effect. The functions that may be used as sources and receivers are related in ways know to those skilled in the art. In many cases the same functions may be used as both sources and as receivers.

One method for producing separated overlapping functions might involve several steps. One might choose to describe a physical region as the union of a collection of overlapping regions. First, for a given property to be optimized one might one might find optimized functions on each of these regions that produce this property. Because these functions are on overlapping regions, there might be so many overlapping functions that they are redundant. The number of these functions may be reduced so as to produce functions on each region that relatively maintain the optimized property and that are non-redundant.

As an example of this method, one might produce overlapping functions that are redundant and where many of them have a desired property. These might be ordered such as from most desirable to least (other orderings and partial orderings will also be used). One then successively chooses the first, second, third, etc. functions on the different regions. Whenever each function is chosen, it is modified to increase its independence from the other functions that have already been chosen. This can be done by using other functions that are also relatively desirable, to accomplish this modification. For example, this could be accomplished by adding a linear combination of these relatively desirable functions. The modified function should also be relatively desirable, as it is created from desirable functions. As this process proceeds, in this embodiment eventually relatively less desirable functions will be used. However, the number of functions that is needed is smaller than those available for the overlapping region. For example one might produce the number of functions associated with a corresponding non-overlapping region, or a similar number. The resulting separated overlapping functions are expected to be more desirable than the non-overlapping functions. This method also can be implemented so as to produce orthogonal or nearly orthogonal functions, if that is desired in a given embodiment.

DETAILED DESCRIPTION

As computers have become more powerful, it has become more practical to use a computer to predict the physical properties of a device to be built. The design of that device may then be modified based on this simulation of the physical properties. That device may then be built or build and tested, or alternatively there may be further design iterations involving further computations of the properties of the device.

Often, the computer resources available limit the types of simulations that may be performed. These simulations often solve continuous problems on a digital computer. In that and other cases, continuous effects are often approximated as due to some combination of a finite number of chosen functions. Often, these simulations may be made more efficient using functions with specific properties. While these functions may sometimes be described as sources, they also have other uses such as receiving and participating in other interactions. A general method for constructing such functions with given properties is disclosed. These given properties may for example be used to make a simulation more efficient or more accurate. This method also enables the use of separated overlapping functions which may improve the optimization of the chosen property (or properties). Furthermore, methods are presented that allow (optionally) increasing the separation of these functions such as by explicitly making these functions non-redundant.

Figure 1:
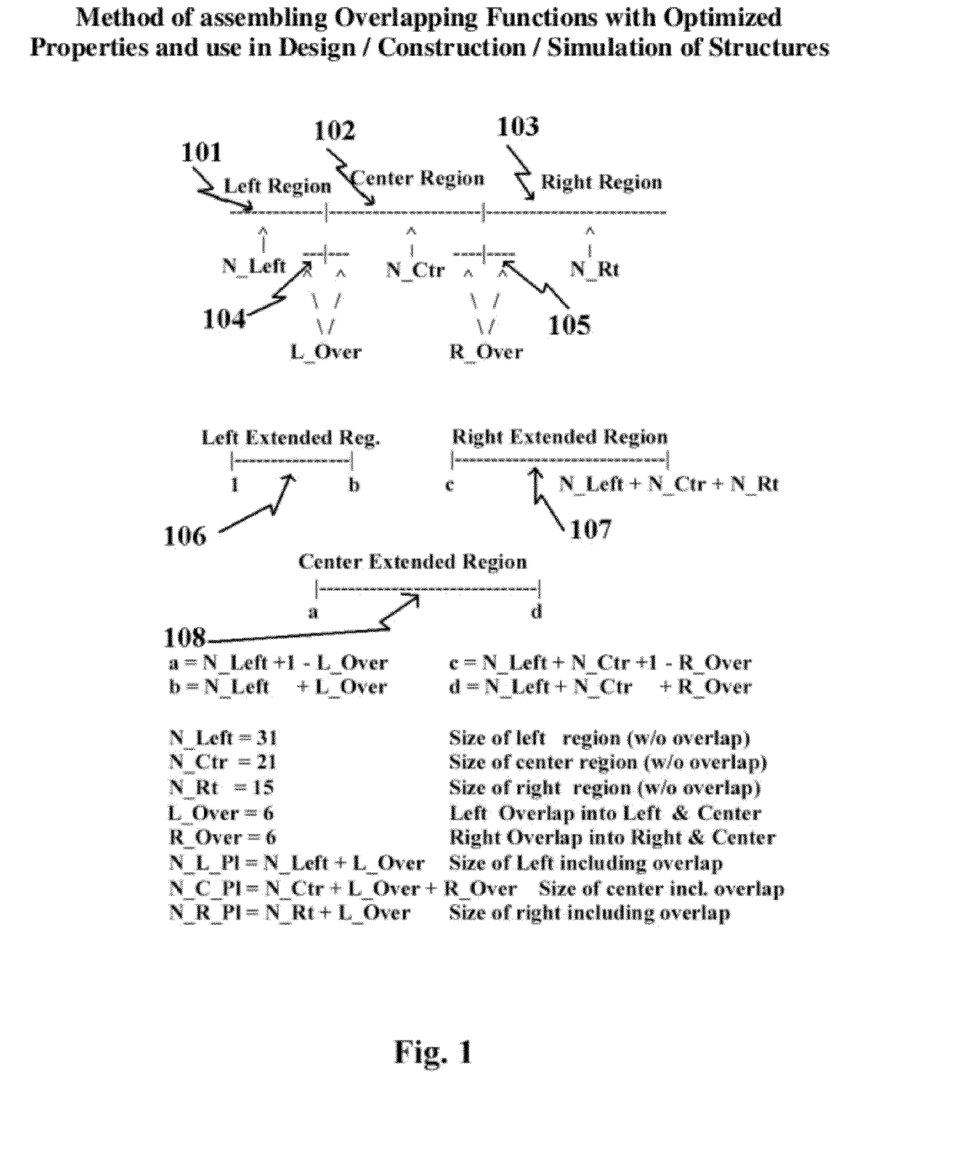
FIG. 1 describes three one dimensional regions. It also describes extensions to these regions that produce three corresponding extended regions that overlap.

FIG. 1 describes three disjoint regions, a left region (101), a center region (102), and a right region (103). It also describes a left overlap region (104) and a right overlap region (105). The left and center regions may be extended to overlap in the left overlap region (104). The center and the right regions may be extended to overlap in the right overlap (105). This creates a left extended region (106), a center extended region (108) and a right extended region (107).

While FIG. 1 describes an embodiment where the overlap occurs along one dimension, in other embodiments this type of overlap may occur in any number of dimensions. For example, when using regions on a surface, more than two regions may be close to one point. In that case, more than two functions may overlap each other at that point. Also, the overlap may extend further into one region than into the other. Also, functions may be defined on regions with varying dimensions. For example, a region may include one dimensional parts (such as thin wires) and also two and three or larger dimensional parts at the same time.

Figure 2:
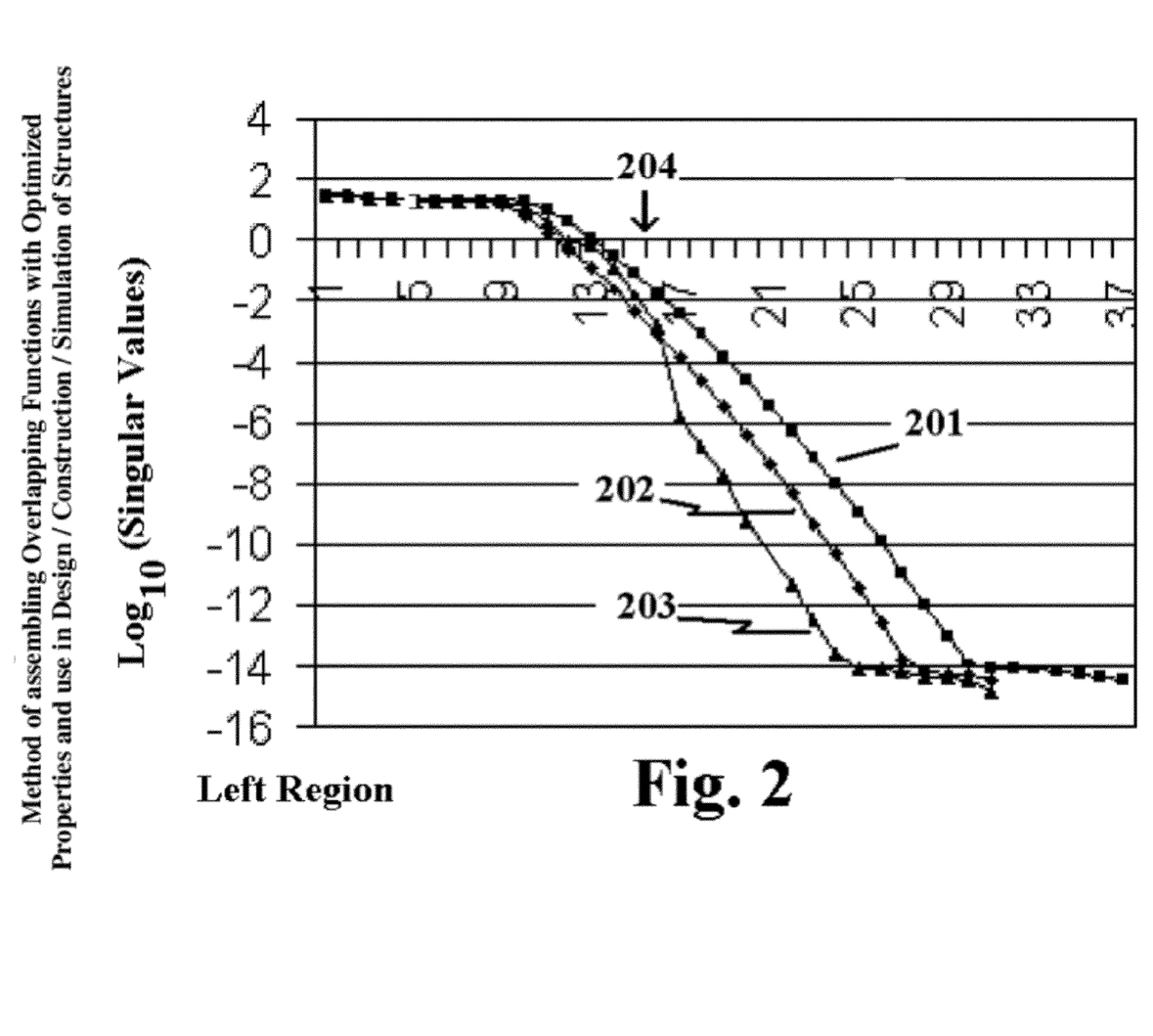
FIG. 2 shows the strength of the radiation of sources for the left portion of FIG. 1. The numbers on the horizontal axis label the source used. Curve 201 describes the strength of the (un-modified) sources for the Left Extended Region. Curve 202 describes the strength of transmission of the sources on the Left (un-extended) Region. Curve 203 describes the strength of radiation of the separated functions on the Left Extended Region after modification by an embodiment disclosed herein. The arrow 204 describes where the number of functions is twice the size of the un-extended region, where that size is expressed in units of wavelength.
Figure 3:
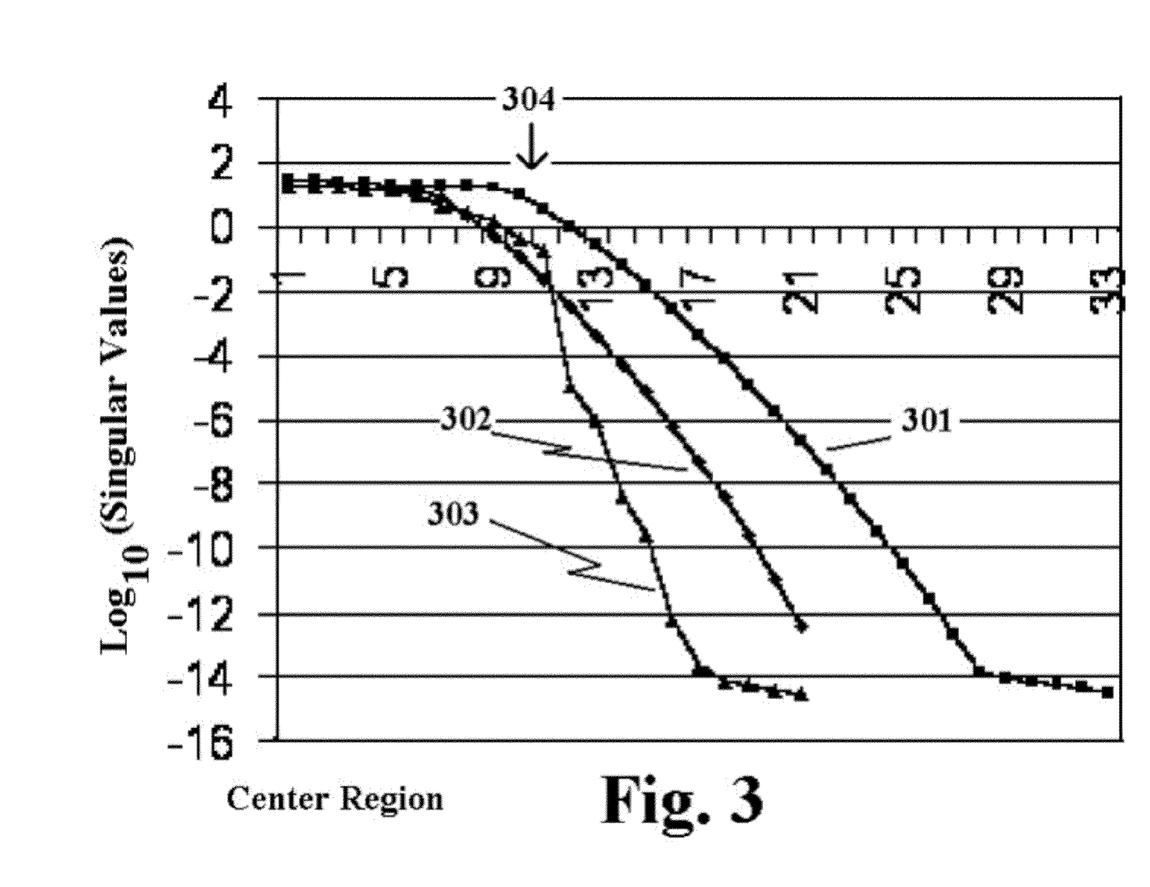
FIG. 3 shows the strength of the sources for the center portion of FIG. 1. Curve 301 describes the strength of transmission of the (un-modified) sources for the Center Extended Region. Curve 302 describes the strength of transmission of the sources on the Center (un-extended) Region. Curve 303 describes the strength of radiation of the separated sources on the Center Extended Region after their construction by an embodiment disclosed herein. The arrow 304 describes where the number of functions is twice the size of the un-extended region.
Figure 4:
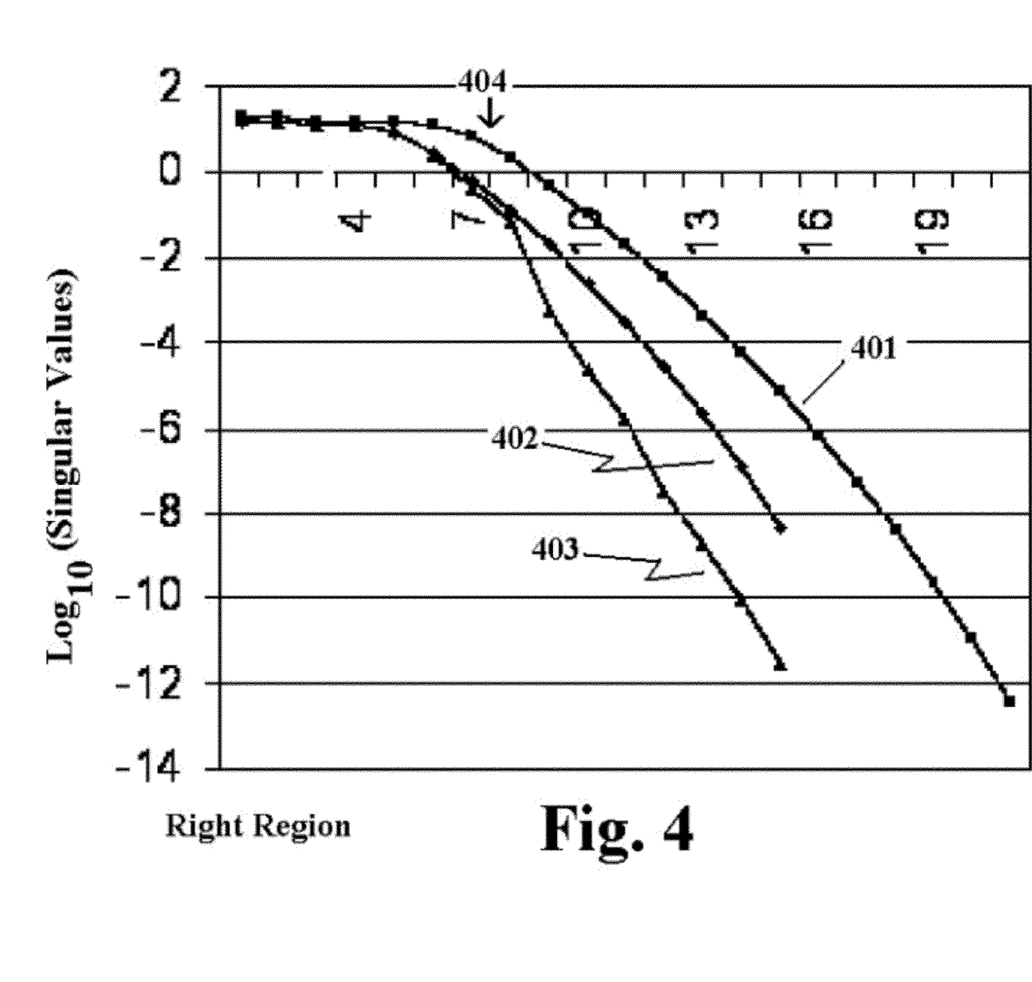
FIG. 4 shows the strength of the transmission of sources for the right portion of FIG. 1. Curve 401 describes the strength of radiation of the (un-modified) sources for the Right Extended Region. Curve 402 describes the strength of the separated sources on the Right (un-extended) Region. Curve 403 describes the strength of radiation of the sources on the Right Extended Region after their production by an embodiment disclosed herein. The arrow 404 describes where the number of functions is twice the size of the un-extended region.

FIGS. 2, 3, and 4 describe a property of various functions. In this embodiment, it is desired to increase the number of functions with associated small singular values. FIG. 2 shows that the singular values of the functions on the left region (202) may be decreased by creating overlapping separated functions which have the singular values plotted in (203). FIG. 1 shows the left region (101) has a length of 31 and the overlap (104) extends a length of 6 into the center region. Thus, there are 37 extended functions on this extended left region. (Note that the length of the region has been described in units of the number of functions used. Other units could be used.)

The extended left region has more functions with large and more functions with small singular values (201) than does the (un-extended) left region (202). Simply removing six functions for the extended region results in 31 functions where more of these functions have small singular values than the 31 functions on the left (un-extended) region. That is, one could remove six of the points plotted in (201) and move the right part of the plot to the left, to obtain a plot similar to (but different from) that of (203). The plot shown on (203) corresponds to functions produced by a related method described next.

FIG. 1 shows 31 functions on the left region, 21 functions on the center region, and 15 functions on the right region. One could produce this same number of functions but with optimized properties (say with many having small singular values) by selecting the appropriate functions from the 37 on the left extended region, from the 33 on the center extended region, and the 21 functions on the right extended region. However, such a method would not ensure that the functions on one region are different from all of those on another region. More importantly, the function space spanned by the functions on the left region and the space spanned by those on the center region might have some function(s) in common (and similarly for the center and right regions). In that case we would say that these groups of functions are redundant because they have not been separated.

In one embodiment, the singular value associated with a function describes how strongly that function transmits or interacts with distant locations. Thus, FIG. 2 shows (202) the radiation strength of optimized sources on the left region. It also shows (201) the radiation strengths of optimized sources on the left extended region. It can be seen that the left extended region has somewhat more sources that radiate strongly and also significantly more sources that radiate or transmit quite weakly as compared to the left region. FIG. 2 also shows (203) the transmission strengths of the new sources produced by this embodiment. It can be seen that there are (in this embodiment, but not in others) the same number of these new sources as for the left region, while there are some that transmit more strongly and many that transmit significantly more weakly as compared to the left region. For example, notice that (204) indicates position 15.5, and that modified functions 17 through 24 (203) transmit over 100 times more weakly than 17 through 24 for the left region (202). Thus, these have more desirable properties than those optimized solely for the (non-extended) left region. In some embodiments, weak interactions may be approximated by zero and this may be used to improve the efficiency of the simulation of physical effects.

FIGS. 3 and 4 describe similar results as FIG. 2, while they describe the center and right regions respectively. All of these figures show groups of new sources that have more sources that transmit weakly and fewer that transmit strongly. This desirable property may be used to produce more efficient methods of computing physical properties and of using the results of that computation to design and build devices. Those skilled in the art will see how to use these methods to produce receivers that receive weakly.

An embodiment will now be described that ensures the functions produced are non-redundant. Appendix A contains a computer program implementing a version of this embodiment. Some results from this computer program are plotted in FIGS. 2-4.

The method of this embodiment begins by producing optimized functions on the left extended, center extended, and right extended regions. For each region, these functions are found by producing a matrix or array such as that illustrated in FIG. 5 (501). Often it is useful for the number of rows of this matrix m to be equal or greater than the number of columns n. Each column of this matrix results from exciting a function that corresponds to one physical location of a source. Then, for a variety of angles (each corresponding to a row of the matrix) the far field strength transmitted by that source is placed in the matrix at the location given by that column and row (502). This far field strength might be the electric field at some large distance or it may be the asymptotic form of that field, $F(A_L)$ (503). For this embodiment, a distance of four was taken to be the distance of a wavelength, and the sources were considered to be on a thin wire.

Figure 5:
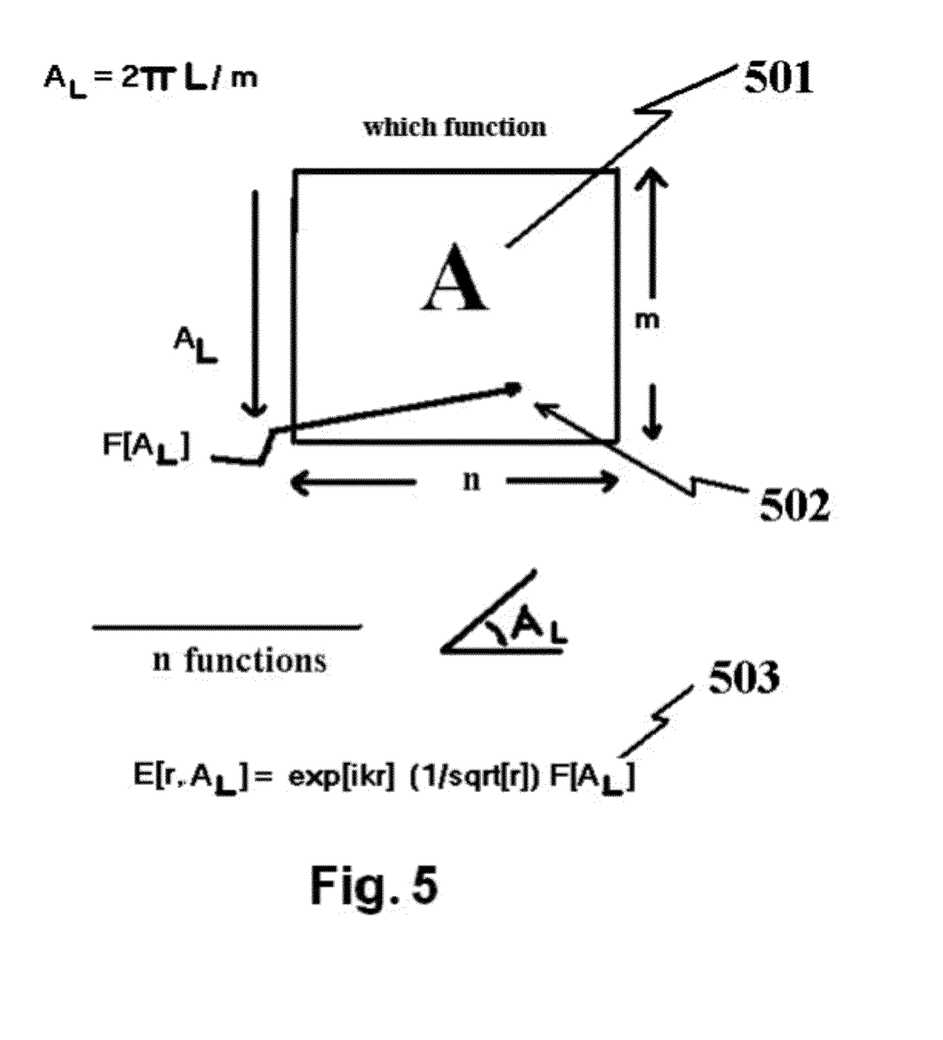
FIG. 5 describes a matrix of effects of each source at different locations. Each column of the matrix corresponds to a different source. Each row corresponds to a location of the effect. In the embodiment shown here, the locations correspond to a large distance in a given direction. This type of matrix or array may also be used in other embodiments.

A matrix method is then applied to that matrix to determine new functions or sources that are linear combinations of the original sources. These new sources each correspond to a strength of radiation. Methods such as the Singular Value Decomposition (SVD), rank revealing factorizations, and others may be used. When using the SVD, the strength of transmission of a new function that is produced corresponds to a singular value that is computed. These are the optimized functions for each region. These optimized functions might be found as the columns of the matrix V in the Singular Value Decomposition of the matrix A (501). Each column of V describes a linear combination of the sources used in producing the matrix A. This linear combination describes a new optimized source associated with a singular value given on the diagonal of the diagonal matrix D.

$$A=UDV^h \quad (1)$$

In other embodiments, other quantities might be optimized and other methods might be used to perform that optimization.

These optimized functions for each extended region will be called the casic functions, and they may be used to produce separated overlapping functions. These basic functions are chosen one at a time. The functions from each region that transmit the weakest are chosen first. Each time a basic function from a region is chosen, it is orthogonalized or approximately orthogonalized to all of the functions associated with other extended regions that have already been chosen and orthogonalized. The orthogonalization is accomplished by adding a linear combination of basic (but not yet chosen) functions from the same extended region that transmit successively strongly. Only as many such functions as are needed are used. This is accomplished using a method that successively uses one more such function until a desired accuracy is attained. Appendix A shows a computer program that accomplishes this by using a QR decomposition on successively more columns of a matrix.

This method proceeds producing separated functions such as those shown on FIG. 2 in (203) for functions successively numbered 31, 30, 29, . . . , 17. This number is just larger than a chosen boundary of one more than two functions per wavelength. (This choice of a boundary is given as one desirable example. Other locations may also be used.) That is, here we use a distance of four to be one wavelength (those skilled in the art know the sampling densities that provide accurate simulation results for a specific problem). Thus, two functions per wavelength is 15.5 which is marked as (204) on FIG. 2. Next, the process proceeds using the basic functions with the largest singular values. Thus, separated function 1 (See the left most point on (203)) is produced using basic function 1, see (201), and a linear combination of other functions with large singular values (the second, then third if necessary, etc.).

Now using the functions with the largest to smallest singular values tends to increase the independence of the new functions produced. That is, the functions on each extended region have been explicitly orthogonalized to the functions on all other extended regions. However, they have not been orthogonalized to those on the same extended region. Making sure the functions with large singular values are used tends to increase the separation of the functions on an extended region from the other functions on that same extended region. The term separated functions indicated that functions on one region are separated from those on a different region (but not the same region). Thus, this tends to improve numerical stability.

In this embodiment, separated functions are created on each region until the number of functions on each region corresponds to the size of the corresponding un-extended region. In other embodiments, these numbers might differ. In this embodiment, functions on each region are created at a rate proportional to the size of the un-extended region, so that the process for each region ends at roughly the same step. However, this may also be changed in other embodiments.

In this embodiment an additional optional step is performed. The separated overlapping functions have been created for the Left, Center, and Right regions. These functions on each region are now orthogonalized with respect to the other functions on the same region.

Alternative embodiments might associate functions with extended regions in alternative ways. That is, based on some criteria for a location associated with each function, each function is associated with a region. A region often corresponds to locations that are close to each other. Thus, one can also speak of a first region being close to a second region, if some of the functions in the first region are close to some of the functions in the second region. Typically, regions are chosen so that they tend not to be long and slender, except when this cannot be avoided.

The embodiment described above produced separated overlapping functions with the properties shown on FIGS. 2-4 as (203), (303), and (403). Some further details about that and related embodiments will now be given. Also, the reason why there are generally enough functions on each region to produce the desired result will be further explained and methods for enhancing this will also be disclosed.

In this embodiment, when N functions are partitioned into n regions, the size of region i will be called $m_i$. This size will also be called the number of center functions. New functions associated with region i will be constructed. The number of functions used will be that of the center functions for this region along with $b_i$ more functions due to the extended region. Thus, associated with region i there are $t_i$ total functions, where $$t_i = m_i + b_i \quad (2)$$

and $$\sum_{k=1}^{n} m_k = N \quad (3)$$

On each Extended Region i, $t_i$ basic functions will created. This may be done as described above (See Equation (1) and FIG. 5). Further description of methods for creating and using these functions is given in U.S. patent application Ser. No. 10/354,241, Filed Jan. 29, 2003, Publication number 20040010400, Published Jan. 15, 2004, Titled "Compression of interaction data using directional sources and/or testers," the entire contents of which is hereby incorporated by reference. From these functions, for each region i, a number of separated functions will be computed from the $t_i$ basic functions for that region (in some embodiments this number is $m_i$), and will therefore be within the linear subspace created by those $t_i$ basic functions on this region. This will be done in such a way so that the separated functions created are approximately linearly independent and roughly orthonormal. When $m_i$ functions are created on each region, then N functions are created in total. It should be possible to create N functions since there were N functions on the non overlapping regions.

These separated functions are somewhat analogous to tapered functions on antennas that improve their performance. This analogy suggests that the non overlapping functions are analogous to functions without a taper, and the separated functions have interaction properties that are analogous to the interaction properties of tapered currents on an antenna. Although the interaction properties are analogous, the separated functions produced here may or may not have a taper. The use of tapered functions is well known to those skilled in the art and appears in numerous publications, including many on antennas. The separated functions produced here, whether or not they have a taper, still have related interaction properties and have many of the same uses as do the tapered functions of prior art. These uses will be apparent to those skilled in the art.

A first version of this embodiment creates these functions in a certain order. That order is one from each region, then a second from each region, and so on. This makes successive passes through all regions, and on each pass considers each region successively. When a region is considered, if less than $m_i$ tapered functions have been created for that region, one more tapered function is created. The basic functions that are used in this process are created on each extended region, so that some property is optimized. For example, the method of FIG. 5 and Equation (1) may be used. That method uses a singular value decomposition, wherein the basic functions produced on each region are naturally ordered by the size of those singular values, from lowest to largest. When a method other than one using the singular value decomposition is used, then a related ordering may be used.

This first method may be described inductively. Consider the step of creating the p-th separated function in the i-th region, using a linear combination of basic functions within the i-th region. At this point, say that a total of r separated functions have already been created on all of the other regions. It is desired that this p-th separated function for the i-th region be orthogonal to all r functions. The p-th basic function for region i is already orthogonal to many functions for other regions but not to others. For example, in FIG. 1 for the size of extended regions shown (but not for others) the left extended region (106) and right extended region (107) do not overlap. We would like to take a linear combination of p-th basic function with later basic functions from region i and produce a new function (the separated function) orthogonal to those functions already produced for all regions other than region i. It is necessary to arrange our computations so we have enough degrees of freedom to accomplish this.

In some cases, one may produce more than $m_i$ separated functions on region i and less than $m_j$ separated functions on region j, so that the total number of separated functions produced is still N (if desired). For example, it is relatively simple in a computer to also produce $m_i+1$ on region i with $m_j-1$ on region j and to examine the resulting the condition number of the matrix with separated functions as columns. Then, the arrangement that produces the smallest condition number could be used. Also, the method described above which first used successive basic functions with increasing singular values and later on jumped to the largest and then used successively decreasing singular values may also be helpful in improving this condition number. A low condition number indicates the functions are far from being linearly dependant.

It is an object of an embodiment of this algorithm to create many separated functions with weak radiation properties. In other embodiments, other properties might be optimized. To that end, when creating the p-th new separated function for region i, initially the functions used will be successive basic functions for region i, in the order of increasing singular values. It remains to describe details of a method for using basic functions within extended region i to create a separated function which is approximately orthogonal to all separated functions for other regions. Assume that there are r relevant separated functions already created on other regions, given by $X_j$ for $j=1, \ldots, r$. Assume also that the basic functions centered on this extended region are $Y_w$ for $w=1, \ldots, t_i$. The p-th separated function for this extended region is created as the quantity in brackets using the formula $$\int X_k \cdot \left[ Y_p - \sum_{s=p+1}^{v} a_s Y_s \right] = 0 \text{ for } k = 1, \ldots, r \quad (4)$$

The upper limit of the sum, v, may be chosen to be $m_i+b_i$ which uses all of the remaining basic functions for region i. Alternatively, it may be chosen as a smaller number. One finds a vector with elements $a_s$ (for $s=p+1, \ldots, v$) that solves (4), and then the term in brackets ("[ . . . ]") is the desired p-th separated function for this region, region i.

In some cases, the number of conditions, r, may be larger than the number of degrees of freedom, v−p. The method has been arranged so that in this case, many of the conditions are not independent (or approximately not dependant), so the equation still (at least approximately) has a solution. Notice that r can be much larger than the size of the overlap, but the number of possible linearly independent conditions is limited by the amount of the overlap. Methods for exploiting these observations will now be disclosed.

There are several possible ways to deal with this issue. A space of dimension $b_i$ may be explicitly constructed, and we may use a basis for that space in (4) rather than using the $X_k$.

However, the computer program of Appendix A that produced the results in FIGS. 2-4 uses a different but related method.

This embodiment approximately solves Eqn. (4) using Householder transformations. This allows the solution of over-determined equations. It also allows the addition of one more degree of freedom (by using one more basic function) until the desired accuracy is achieved. This corresponds to successively increasing v by one in Eqn. (4). The Householder transformations are applied to a matrix of overlap integrals between separated functions from other regions and basic functions from this region. Equation (4) can be rewritten to show its matrix character more clearly, as $$\sum_{s=p+1}^{v} \left[ \int X_k \cdot Y s \right] a_s = \int X_k \cdot Y_p \text{ for } k = 1, \ldots, r \quad (5)$$

The matrix on the left hand side may be called M, the vector of values of $a_s$ called A, and the right hand side vector called F. Here, the new p-th separated function for this region $X'_p$ is given by $$X'_p = Y_p - \sum_{s=p+1}^{v} a_s Y s \quad (6)$$

It is desired that for the smaller values of p, the function $X'_p$ radiates weakly, or maintains the desired property given to the corresponding $Y_p$. For that reason, it is desired to truncate the sums in (4) through (6) with a small value of v. One may note that, since p is fixed, (5) has the form of a matrix times an unknown vector (with components $a_s$) equals a given vector. Using a smaller value of v is equivalent to requiring that the later values of $a_s$ (i.e., for larger values of s) equal zero. This means that the matrix problem may become (or become more) over-determined. That is, we may try to solve (5) approximately, so the expansion (6) involves fewer basic functions $Y_s$.

Equation (5) may be written in matrix form as $$MA = F \quad (7)$$

It is desired to find an approximate solution where the later elements of the vector A are exactly zero. The orthogonal transformations used in a standard QR factorization are applied to the first z columns of M. Thus, after z steps, the orthogonal (or Hermitian) matrix $Q_z$ applied to M, gives a matrix $Q_z M$. After z steps of orthogonal transformations (such as Householder transformations), we have $$Q_z MA = Q_z F \quad (8)$$

These transformations make each of the first z columns of the product $Q_z M$ have all zeros below its diagonal. The later columns of M are often nearly linear dependent on the earlier columns of M. This is not a general property of these matrix methods but rather it depends on how this matrix M was constructed. This may be due in part to there being more overlapping functions than points (or degrees of freedom, $b_i$). These transformations are applied to successive columns, since it is known how to quickly compute $Q_{z+1} F$ from $Q_z F$ and how to compute $Q_{z+1} M$ from $Q_z M$.

This process proceeds until the part of $Q_z F$ after element z is acceptably small. Again, this is not a general mathematical property but is likely to occur here due to the process used to assemble F. Then, the triangular nature of the first z columns of $Q_z M$ immediately provides a solution using only the first z elements of the vector A. This solution is correctly gives the first z elements of $Q_z F$ and gives zero for the remaining elements. This allows an approximate solution with an error of the size of the part of the vector $Q_z F$ after its first z elements. The subroutine SSQRDef in the computer program appendix shows one implementation of this method. There are many possible variations to this approximate solution method.

Other embodiments may, for example, use other methods for choosing good functions from a larger set of functions, so that the desired property remains. For example, rather than developing all of the functions at first, one might choose good functions, and iteratively take all of the left over functions, and from them produce a few good functions at each step. This might be done to preserve orthogonality, or not. There are other possible embodiments as well. For example, one might choose the functions on other orders, and so on.

Figure 6:
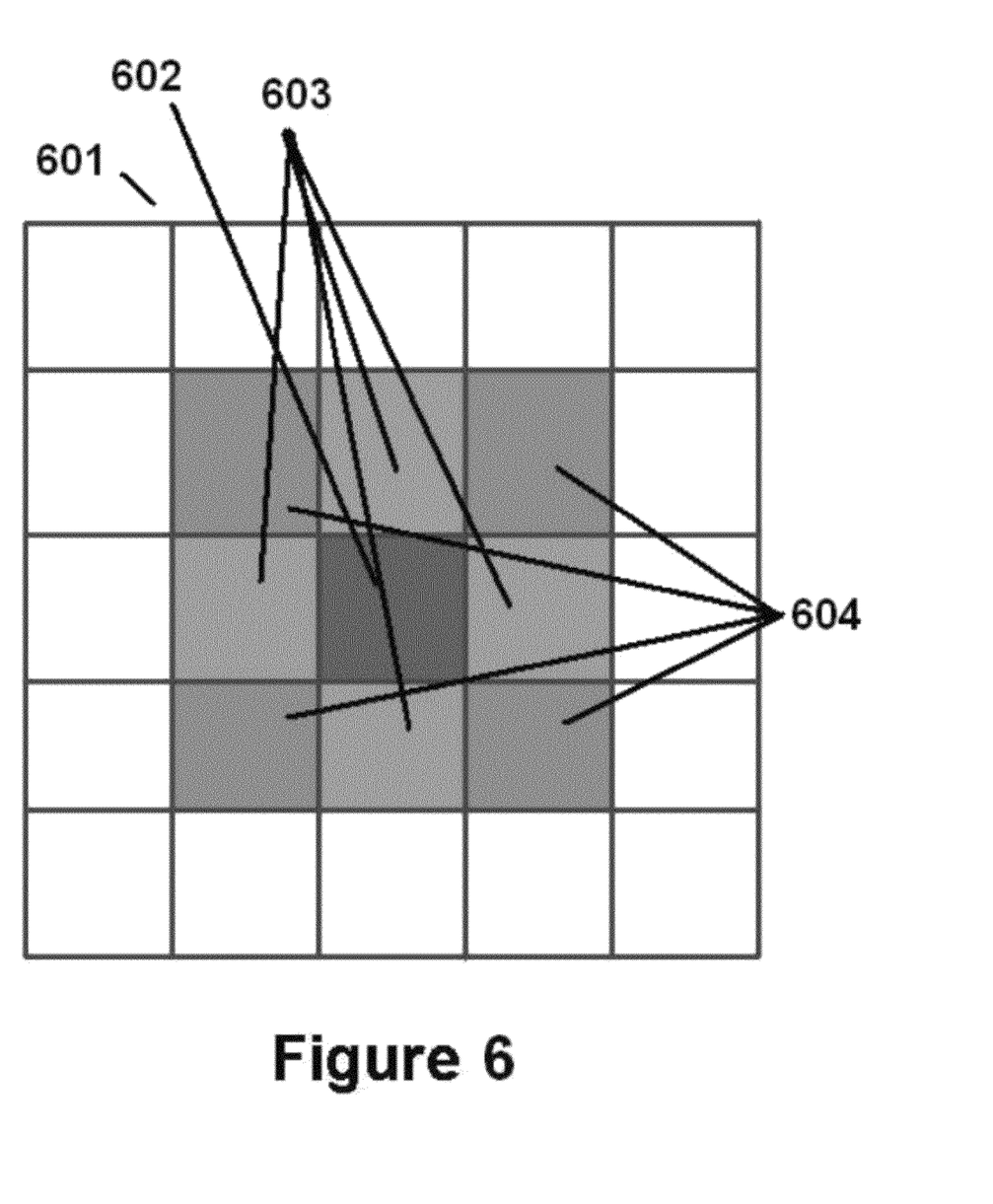
FIG. 6 shows the near neighbors of a physical location on a two dimensional surface.

FIG. 6 illustrates the reason why producing more sources that transmit weakly can be useful. FIG. 6 shows (601) a two dimensional surface partitioned into regions. With respect to a chosen region (602), there are four side neighbor regions (603) and four corner neighbor regions (604). Many of the efficiencies in simulations of physical devices due to weak transmission of many sources are only for interactions over some distance and further. On the other hand, manipulating interaction matrices is generally easier if the neighboring regions are made smaller. The new sources created by the methods disclosed herein sometimes allow smaller neighboring regions along with weak transmission due to two of their properties. First, by overlapping they exist on a larger (extended) region. Second, and possibly more important, because of their construction relatively many of their sources transmit weakly. An alternative method to achieve this is to use larger physical regions and that method has other numerical inefficiencies, and they may be avoided by using these new sources.

Overlapping separated sources may be used in many computations including those based on integral equations and differential equations. For example, in electromagnetic computations one such integral equation based method is called the Moment Method, or the Method of Moments. A standard reference in this field that describes methods well known to those skilled in the art is "Field Computation by Moment Methods," by Robert F. Harrington, 1968, reprinted in 1983 by Robert E. Kreiger Publishing Company. That text describes (Chapter 3, Pages 41-49) a computation of electromagnetic properties for a problem involving cylinders and a specific direction of the electric field (TM). The embodiment that created the separated functions described in FIGS. 2-4 optimized properties (weak transmission) for wires, not the cylinders used here. Nevertheless, using them in computations for a cylinder may still provide advantages.

The one dimensional surface described in FIG. 1 may be considered as the generator (or projection) of a cylinder, for a cylinder which is a flat strip. Using sources that are localized, four per wavelength (as was used earlier, so the separated overlapping functions match this problem), creates a model of the electric field. This field is also tested using four samples per wavelength, so the 67 locations of FIG. 1 describe a body 67/4=16.75 wavelengths long. This is a relatively small problem. Modern computers routinely solve problems with tens of thousands of sources and more. Nevertheless, even for this small problem separated overlapping functions provide efficiencies. These efficiencies often become very significant for large problems.

An array that describes how each one of the 67 localized sources produces an electric field tested at each of the 67 testing locations has 67 rows and 67 columns. Here the sources used are localized pulses and the testing of the field is done by "delta functions" which examine its value at one point. Other implementations of the Moment Method and of other methods including Nystroms method and others may also be used. This array describes the interactions among these sources and testing functions and is an array of interaction data. It also may be used as a matrix of data.

Figure 7:
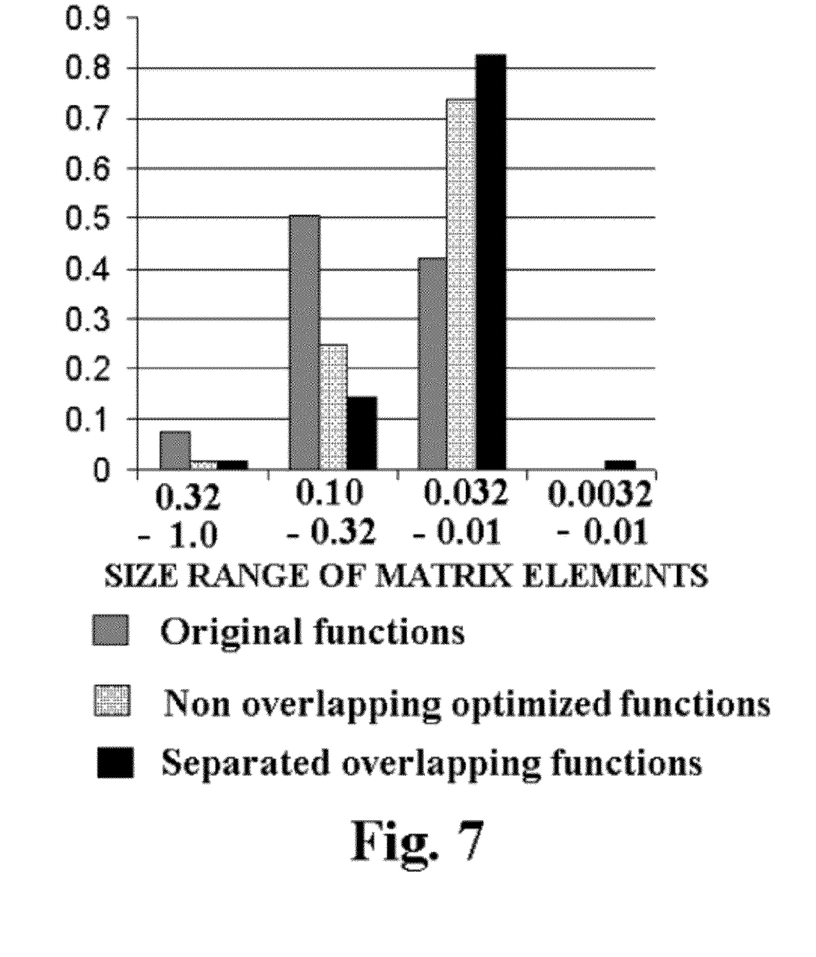
FIG. 7 shows a histogram of the size of the elements in a matrix of interactions. These interactions are show using local functions, using optimized non overlapping functions, and using overlapping separated functions.

FIG. 7 shows a histogram of the magnitudes of the elements of this matrix. The vertical scale shows that fraction of the matrix elements that have a magnitude within each histogram bin. The matrix just described is labeled "original functions" on that graph. It can be seen that the "optimized functions" generate more small matrix elements that the "original functions". The "separated overlapping functions" provide even more small matrix elements.

In many computations small matrix elements may be approximated by zero, allowing the matrix to be stored with less memory. Also, simulations using this matrix may be performed with fewer operations reducing the computer time necessary to perform the simulation. Thus, the separated matrix elements allow simulations to be performed using reduced computer resources.

On FIG. 7, the matrix described as using the 'separated overlapping functions" differs from the matrix using the "original functions" by a transformation that incorporates these modified functions. The transformation is produced by a 67 by 67 transformation matrix T that is defined as having zero elements except in the following locations. This matrix corresponds to functions with the size and overlap described in FIG. 1. The first 31 columns of T contain the 31 separated overlapping functions for the left. Since these functions exist on the leftmost 37 locations of FIG. 1, each functions occupies rows 1 through 37 of T. The next 21 columns of T (columns 32 through 52) contain the separated overlapping functions for the center. Since these functions are non zero on locations 26 through 57 of the structure shown in FIG. 1, they occupy rows 26 through 58 of the matrix T. Finally, columns 53 through 67 of T contain the separated overlapping functions from the right. They occupy rows 47 through 67 of T.

The matrix using separated overlapping functions, matrix S, (see FIG. 7) can be found from the matrix Z which uses the "original functions" (see FIG. 7) by the formula $$S = T^h Z T \quad (9)$$

Other embodiments might use different matrices on each side of Z. This provides an efficient method for solving a matrix equation such as $$ZJ = E \quad (10)$$

This may be solved by first finding I in $$SI = T^h Z T I = T^h E \quad (11)$$

And then finding J as $$J = TI \quad (12)$$

Other embodiments may use these overlapping functions in other ways. As one example, one could use overlapping functions that have a weak interaction of a chosen desired property with a specific desired thing or things. For example, an embodiment discussed above used FIG. 5 to describe a matrix of interactions at a large distance. There, it was desired to have many functions that had a weak interaction at large distances. Here, we pick another property. For example, FIG. 6 describes a two dimensional region (601) that is partitioned into squares. For example, one could create overlapping functions that are each associated with a square, and that generally overlap onto other squares. Note this is different from FIG. 1 where the physical region was one dimensional. One embodiment might use the same criteria of weak interactions at a distance. As one alternative, one might use the criteria of a strong interaction of one square (say square (602)) with itself or with a particular other square. Methods for controlling such angular regions were described in patent application Ser. No. 10/354,241, Filed Jan. 29, 2003, Publication number 20040010400, Published Jan. 15, 2004, Titled "Compression of interaction data using directional sources and/or testers."

As an example of one particular embodiment, consider overlapping functions for region (602) and the criteria that these functions interact weakly with all of the overlapping functions for other regions or squares (meaning other than for (602)) in (601). One could create a matrix A where its columns correspond to overlapping functions for region (602) and each group of rows corresponds to the overlapping functions for one region (i.e. one of the squares in (601) other than the square (602)). The use of squares here is given as an easy to visualize example and not as a limitation. This matrix A might be used to create separated overlapping functions for (602), by the same or a related embodiment to those used above with A from FIG. 5.

In this embodiment, separated overlapping functions could be created for region (602) and also could similarly be created for the other regions on (601). Then an interaction matrix could be created directly using these functions or an existing one could be transformed to use them (see Eqn. 9). This matrix would then have a structure that is especially useful for computations. Here, many of the functions only have a significant effect on the self region.

The parts of the matrix described by these functions (e.g., those rows and/or columns) are tightly banded. That is, parts of this matrix involve weak or negligible interactions, which either have zero strength or have a strength that may be approximated by zero. Such a matrix with a substantial number of zeros is a sparse matrix. The structure or the sparseness (i.e. the location of the zeros) in this embodiment is well known to allow highly efficient computations using this matrix. Many other embodiments also have a sparseness structure that may result in efficient computations.

For the one dimensional surface shown in FIG. 1 it is clear how to find basic overlapping functions. FIG. 1 describes overlap regions (104) and (105). Here (104) extends the same distance into the left region (101) as it does into the center region (102). In other embodiments the distance into one region might be different from that into another. In other cases, as one embodiment one might create regions by first choosing control points, and then saying that a region is defined as that part of space that is closer (or equally close to) to one control point than to any other. Then, one could choose an overlapping region as one outside a particular region but where the distance to the particular region's control point differs from the distance to another region's control point by less than some predefined amount. This one embodiment is not given as a limitation, but rather as one method that may be used to find overlapping regions for complicated geometries in any number of dimensions.

Many physical devices are designed and built using physical simulations, and many more will be designed and built using simulations in the future. Furthermore, many new devices have embedded processing that makes use of increasingly sophisticated algorithms. Some of these simulations involve only one type of physical characteristic and others involve the interaction of many physical characteristics or properties. Some of the more common physical properties involve electric fields, magnetic fields, heat transfer, mechanical properties, acoustics, vibration, fluid flow, particle fluxes, convection, conduction ablation, diffusion, electrical properties, gravity, light, infrared radiation, other radiation, electrical charge, magnetic charge, pressures, nuclear forces, and the like.

Just as there are many physical properties or characteristics that may be simulated, there are also a large number of physical devices that may be simulated or that may have embedded simulations or other calculations or processing within them. For example, electromechanical systems are often simulated before they are built. These same systems often become a part of a device that itself has significant processing within it. Another example might be a modem aircraft. The aircraft itself will be designed using a large number of simulations for various aspects and components of the aircraft. The control system of the aircraft, its engines and so on may also involve significant computer processing in their functioning. For example, in many aircraft when the pilot commands a turn, often he really is providing input to a computer that then computes how the aircraft's various control surfaces are to be moved. Automobile engines now often use a computer and so do jet and other engines. Thus, many modem devices are either designed using computer based simulations or have computing power or simulations within them, or both.

Some of the physical devices that may be designed using a simulation of their physical properties are electromechanical devices, MEMS devices, semiconductors, integrated circuits, anisotropic materials, alloys, new states of matter, fluid mixtures, bubbles, ablative materials, and filters for liquids, for gases, and for other matter (e.g., small particles). Other physical devices may involve acoustics, convection, conduction of heat, diffusion, chemical reactions, and the like. Further devices may be used in creating, controlling or monitoring combustion, chemical reactions or power generation. Motors and generators are also often simulated during the design process, and they may also have computational processing within them.

Vehicles, including airborne, ground borne, and seagoing vehicles may have their drag due to fluid flow simulated, and they may also have their vibration and structural properties simulated. Downward forces due to wind flow are also important for increasing traction for high performance vehicles and simulations are often used to design appropriate body shapes. Sound generated due to an open sun roof or an open window in a passenger car are further examples. The movement of fuel within fuel tanks is also a concern and may be simulated. The acoustic properties of submarines and of auditoriums are also often simulated. The strength and other properties of bridges when under loads due to weights on them, winds, and other factors are also subject to simulation.

Devices that cool electronic circuits, such as computer central processing units, may also be simulated. Parts of electronic circuits also may be designed using large scale simulations. This includes microwave filters, mixers, microstrip circuits and integrated circuits. It includes waveguides, transmission lines, coaxial cables and other cables. It also includes antennas. Antennas may transmit and receive, and in addition to electronic antennas, many other types of antennas (including, among other things, speakers that transmit sound) may also be simulated. This includes also antennas that receive (for example, it includes a microphone for sound). The design of electronic circuits, with or without the presence of electromagnetic interference, is an especially important field, as is the calculation of radar and sonar scattering.

The flow of fluids through jet and rocket engines, inlets, nozzles, thrust reversers compressors, pumps and water pipes and other channels may also be simulated. The dispersion of gasses, both beneficial and harmful through urban areas, oceans and the atmosphere are further examples. The aerodynamics of bullets and guns are yet another example.

Further examples are radomes and windows. A personal automobile may have windows that also act as radio antennas. These windows may be designed, using simulations of physical phenomena, so that certain frequencies of radiation pass through easily and others do not. This is one type of frequency selective surface. Such devices may also sometimes be subject to control through applied voltages or other inputs. Many devices also must be designed to be robust in the presence of electromagnetic interference. The source may be other nearby equipment or it may be a hostile source, such as a jammer or an electromagnetic pulse.

Figure 8:
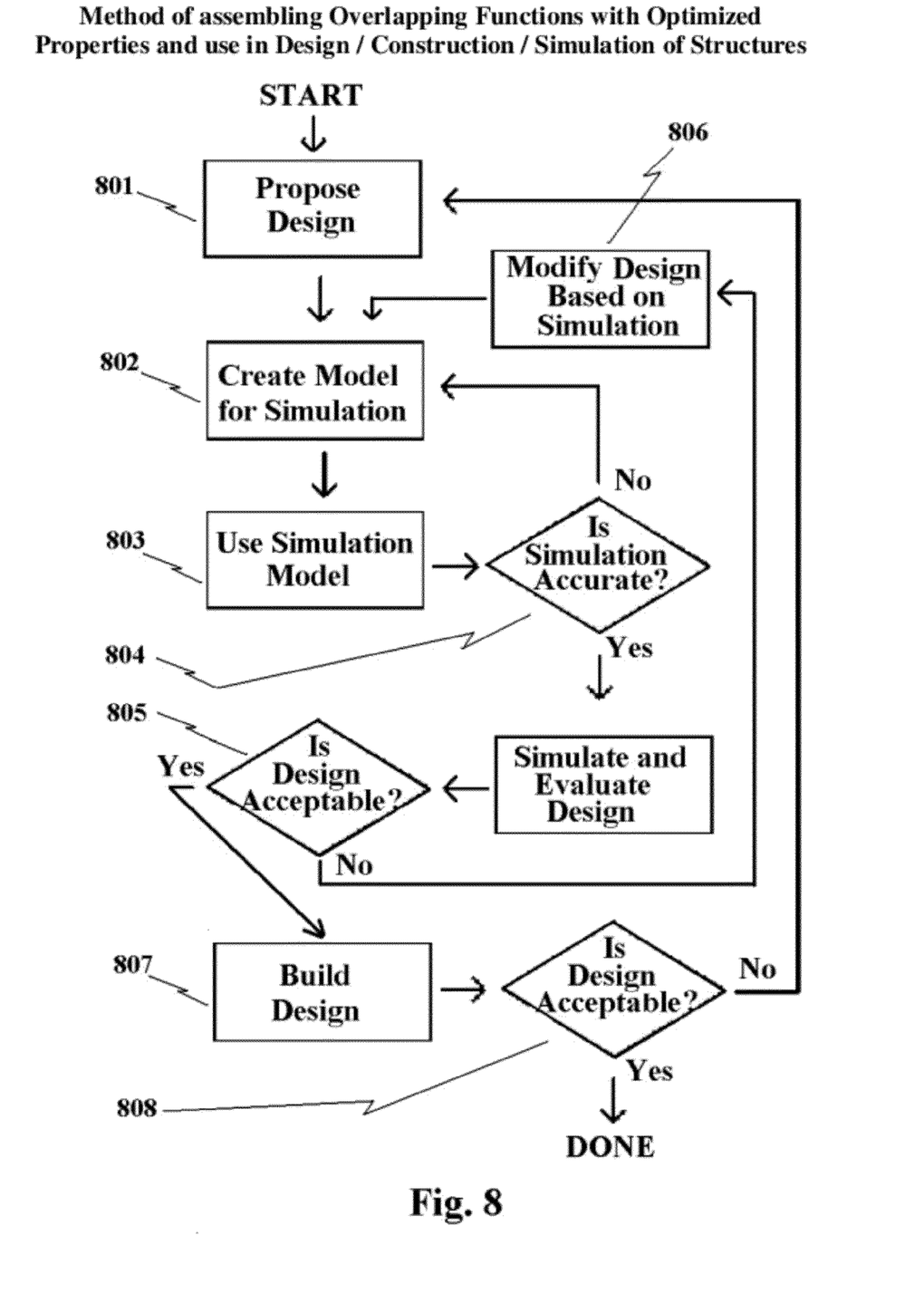
FIG. 8 shows a flow chart of a method of designing and building a physical device where a simulation is used in producing the design that is built.

FIG. 8 describes an embodiment of a design and build process that intrinsically uses a simulation of a property or properties of the device built. In step (801), a design is proposed. In step (802), a model of that design or of some aspect(s) of the design is created. Then, (803) a simulation is used to test simulation accuracy (804). This step may optionally be omitted. Then, the simulation is used to evaluate the property being evaluated. A decision is made (805) of whether this aspect of the design is acceptable. The design may then be modified based on this simulation information (806) and optionally further simulations may be performed. When it is found to be acceptable it is built (807). Optionally, after it is built it may be further evaluated by some means (808) and may then either be accepted or there may be further modifications.

Large scale simulations are not limited to the physical properties of devices. For example, aspects of stocks, bonds, options and commodities may also be simulated. These aspects include risk and expected values. The behavior of Markov chains and processes (and of the matrices representing them) and of probabilistic events may be simulated. This is an old field, as the use of large matrices for large financial problems was discussed at least as far back as 1980, in the book *Accounting Models* by Michel J. Mepham from Heriot-Watt University, Edinburgh (Polytech Publishers LTD, Stockport, Great Britian). Econometric systems may be modeled using large simulations. See, for example, Gregory C. Chow and Sharon Bernstein Megdal, "The Control of Large-Scale Nonlinear Econometric Systems," IEEE Transactions on Automatic Control, Volume 23, April 1978. Some problems relate to investment strategies involving large scale computations that may be made more efficient using the methods of the present application. For example, see Thierry Post, "On the dual test for SSD efficiency with an application to momentum investment strategies," European Journal of Operational Research, 2006. Financial firms now routinely often employ Quantitative Analysts (often called Quants) to work on these simulations. Many of these simulations use coupled differential equations and/or integral equations. The methods of the present patent application may be used to improve the efficiency of simulations for these and other types of problems.

The methods disclosed in this application may be used to improve many existing computer simulations. These methods have a significant advantage over prior methods since these methods are relatively easy to implement in existing computer simulations. That is, one does not have to understand the details of an existing computer simulation to implement these methods. In one embodiment the main issue is that an array of disturbances is often needed from an existing simulation. However, this is relatively easy to produce from an existing simulation. These disturbances are generally already computed in the simulation, and it is only necessary to make them available. For example, one embodiment modifies the well known simulation program, the Numerical Electromagnetics Code (NEC) to improve its efficiency. In that embodiment, NEC already has computer subroutines for computing the electric field due to an electric current on the body being simulated. Multiple calls to this subroutine produced the disturbances that then are used for data compression (for example see the matrix A in FIG. 5), and to get an answer from NEC more efficiently.

It is apparent to those skilled in the art how to modify an existing computer simulation or calculation program to use the methods disclosed here. An advantage of the present invention is that then the use of that simulation or calculation program is quite similar to its use before modification. As a result, someone who has used a simulation program may use the modified version for its intended purpose without further training, but can get a solution either faster, or on a smaller computer, or for a larger problem. Computer programs exist for designing all of or an aspect of many physical devices. NEC has been used for over twenty years to design electromagnetic antennas. More powerful simulations are now available, and are used to design antennas, the electromagnetic scattering properties of vehicles used on land, water and air. There are many fluid flow computer programs available. One of the more popular is Fluent, which is sold by Ansys. Many electronic devices are designed using the various simulations sold by Ansoft and other companies. Also, Multiphysics software is now available for many problems, such as that produced by Comsol. These programs compute the coupled the interactions of many different physical effects. In each of these fields, it is well known how to design devices using this software. These devices are then often built based on these designs. Often, the software used to specify a design so that it may be built is coupled with the simulation software. Solving more difficult or larger problems is an important issue, and using the methods of the present application in these existing simulations (or in new simulation programs) makes this possible.

In some cases, simulations are used for more than to just design a device. Often, detailed design information is created. Sometimes this is then directly passed on to other automatic equipment that builds the device. This is commonly referred to Computer Aided Design and Computer Aided Engineering. Sometimes the model that is used for simulation is also used for construction, while sometimes a related design is built or a related representation of the design is used for construction.

Many of these simulations involve approximating a continuous body using a grid or other discrete model. These models may then be used as a part of a computer simulation that computes some properties, such as physical properties. For those skilled in the art, it is well know how to create discrete or other models. There is readily available computer software that creates a variety of these models. These simulations are then used to design various physical devices and are also often used to aid in the construction of a device. For example, sometimes a design is passed on to equipment such as a lathe that accepts instructions in a numerical form.

As an example of the use of a faster simulation of electromagnetic effects, and how it may be used to design and build something, consider electromagnetic antennas on a ship. One may already have a ship that has been built and is in use. However, its need for antennas may change. It may be necessary, among other things, to build and install a new antenna. One possible way this may be done is by using a simulation of electromagnetics that makes use of methods described herein. That simulation might be used to design the properties of the antenna when it is used in isolation. Alternatively, it might be used to simulate the properties of the antenna when it is used in its desired location. The presence of other antennas and other structures may modify the antennas performance. Then, the design might be modified by moving the antenna, moving other structures, or modifying the antennas shape or other structure. Then, the antenna might be installed and tested. Simulations might also be used to design a feed structure for the electromagnetic signals flowing into the antenna for transmission or flowing out of the antenna for reception. There are a large number of ways in which simulations may be used for design and also for building various devices. Some of the more common applications are for designing the radar scattering properties of ships, aircraft and other vehicles, for designing the coupled electrical and mechanical (including fluid flow) properties of MEMS devices, and for the heat and fluid flow properties of combustion chambers, and for using this information in then modifying existing devices or in building new devices.

The algorithms in the above disclosure can be implemented in software and loaded into a computer memory attached to a computer processor to calculate various effects and physical properties such as those described above. Although the foregoing has been a description and illustration of specific embodiments of the invention, various modifications and changes can be made thereto by persons skilled in the art without departing from the scope and spirit of the invention

What is claimed is:

1. A method of designing a physical device using a simulation incorporating separated overlapping functions, wherein said physical device is designed by a method comprising:

proposing a design of said device, simulating at least one property of said proposed design;

said at least one property describing a characteristic of the functioning of said device;

based at least in part on the result of said simulation, proposing a modified design of said device;

building said device based on said modified design;

said simulation using a plurality of said separated overlapping functions, said separated overlapping functions produced by a method comprising:

choosing a plurality of overlapping regions;

for each particular region of said plurality of regions, producing and storing in a computer readable medium a plurality of first overlapping functions associated with said particular region, said first plurality of overlapping functions comprising a plurality of overlapping functions having a strong transmission property and a plurality of overlapping functions that do not have said strong transmission property;

for each said particular region, on a computer processor taking linear combinations of said associated plurality of first overlapping functions to produce one or more separated overlapping functions associated with said particular region having a related strong transmission property and to produce one or more separated overlapping functions associated with said particular region not having said related strong transmission property.

2. The method of claim 1 wherein for each said particular region said linear combinations of said associated plurality of first overlapping functions approximately produce one or more separated overlapping functions that are substantially orthogonal to the separated overlapping functions associated with all regions of said plurality of overlapping regions other than said particular region.

3. The method of claim 1 wherein said separated overlapping functions describe, at least in part, a physical source comprising at least one of an electric current, and electric charge, a force, a particle flux, a source of particles and a physical position of a physical object.

4. The method of claim 1 wherein for at least one of said regions, said associated one or more separated overlapping functions comprise a plurality of separated overlapping functions that are approximately orthogonal to all other separated overlapping functions associated with said at least one of said regions.

5. The method of claim 1 wherein said first overlapping functions have an optimized property for use in said simulation and said separated overlapping functions substantially have said optimized property.

6. The method of claim 1 wherein for at least one of said overlapping regions:
one or more of said associated first overlapping functions does not have said strong transmission property; and
a plurality of said associated separated overlapping functions is produced from a linear combination of only said plurality having said strong transmission property.

7. The method of claim 1 wherein:
said simulation uses an array of interaction data; and
said array is compressed using said separated overlapping functions.

8. The method of claim 1 wherein:
said device comprises an antenna; and
said simulated property describes an aspect of the transmission characteristics of said antenna.

9. A physical device containing an embedded computer wherein:
said embedded computer directly or indirectly controls a physical position of at least one object and wherein said embedded computer controls said physical position using non redundant overlapping functions produced by a method comprising;
choosing a plurality of overlapping regions;
for each particular region of said plurality of overlapping regions producing a first plurality of overlapping functions associated with said particular region and a second plurality of overlapping functions associated with said particular region;
choosing a strong transmission property for said non redundant overlapping functions for their use in said embedded computer;
wherein for said each particular region the overlapping functions in said first plurality have said chosen property and the overlapping functions of said second plurality do not have said chosen property;
for each said particular region producing a plurality of non redundant overlapping functions that has said chosen property from only said first plurality and producing a plurality of non redundant overlapping functions that does not have said chosen property from only said second plurality.

10. The device of claim 9 comprised of said embedded computer and a second computer wherein said second computer receives data from said embedded computer, said received data processed using said non redundant overlapping functions and said second computer directly controlling the physical position of a part of said device.

11. The device of claim 9 wherein for at least one particular region one or more of said associated non redundant overlapping functions produces a negligible effect at all regions of said plurality of overlapping regions other than said one particular region.

12. The device of claim 9 further comprising a computing means configured to produce an array of interaction data, said array using said non redundant overlapping functions.

13. A computer implemented method of determining a physical effect due to sources at distributed locations comprising:
finding a plurality of overlapping regions;
for each of said overlapping regions, storing in a computer memory a stored plurality of overlapping functions associated with said each overlapping region;
on a computer processor, from each stored plurality of overlapping functions, computing a plurality of separated functions wherein for each region said plurality of separated functions comprises one or more first separated functions and one or more second separated functions wherein said first separated functions have a strong transmission property and said second separated functions do not have said strong transmission property and wherein for each region said plurality of separated functions is contained within the space generated by said associated stored plurality of functions; and
using said separated functions to compute said physical effect.

14. The method of claim 13 further comprising using said separated functions to produce an array of interaction data;
storing said array of interaction data in a computer memory wherein said array of interaction data is compressed and using a computer processor and using said compressed array of interaction data to compute physical effects involving physical sources comprising at least one of an electric current, and electric charge, a force, a particle flux, a source of particles and a physical position of a physical object.

15. The method of claim 14 wherein said compressed array has a substantial number of elements that have been approximated by zero.

16. The method of claim 13 wherein for each of said regions, said separated functions associated with a particular region are each substantially given by some linear combination of said first overlapping functions associated with said particular region.

17. The method of claim 13 wherein said separated functions are substantially orthogonal to each other.

* * * * *